United States Patent
Taniguchi et al.

(10) Patent No.: US 9,768,917 B2
(45) Date of Patent: Sep. 19, 2017

(54) COMMUNICATION CONTROL METHOD, NETWORK SYSTEM, AND COMMUNICATION DEVICE

(71) Applicant: FUJITSU LIMITED, Kawasaki-shi, Kanagawa (JP)

(72) Inventors: Yuichiro Taniguchi, Oota (JP); Tetsu Yamamoto, Kawasaki (JP); Kazuya Kawashima, Fukuoka (JP); Syunsuke Koga, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/660,659

(22) Filed: Mar. 17, 2015

(65) Prior Publication Data
US 2015/0188669 A1 Jul. 2, 2015

Related U.S. Application Data

(63) Continuation of application No. PCT/JP2012/006969, filed on Oct. 31, 2012.

(51) Int. Cl.
*H04L 12/751* (2013.01)
*H04L 12/707* (2013.01)
(Continued)

(52) U.S. Cl.
CPC .............. *H04L 1/08* (2013.01); *H04L 1/1867* (2013.01); *H04L 43/0847* (2013.01);
(Continued)

(58) Field of Classification Search
CPC ......... H04L 41/12; H04L 45/02; H04L 45/26; H04L 2001/0092; H04W 84/18
See application file for complete search history.

(56) References Cited

U.S. PATENT DOCUMENTS

| 6,421,354 B1* | 7/2002 | Godlewski | G08C 17/00 340/870.01 |
| 2004/0264466 A1* | 12/2004 | Huang | H04L 45/123 370/392 |

(Continued)

FOREIGN PATENT DOCUMENTS

| CN | 101730259 A | 6/2010 |
| JP | 2005-277566 A | 10/2005 |

(Continued)

OTHER PUBLICATIONS

International Search Report mailed Nov. 27, 2012 for PCT/JP2012/006969 filed Oct. 31, 2012 with English Translation.

(Continued)

*Primary Examiner* — Scott M Sciacca
(74) *Attorney, Agent, or Firm* — Oblon, McClelland, Maier & Neustadt, L.L.P.

(57) ABSTRACT

A communication control method to be executed by a communication device, includes: transmitting, to one or more communication devices coupled to the communication device, a packet in which a destination is set; and determining, based on the number of paths that are among paths extending through the one or more communication devices to the destination and through which a response to the packet is received from the destination, the number of times of retransmission in the transmission of another packet to the destination.

12 Claims, 12 Drawing Sheets

(51) Int. Cl.
- *H04L 1/08* (2006.01)
- *H04W 40/02* (2009.01)
- *H04L 12/721* (2013.01)
- *H04L 12/26* (2006.01)
- *H04L 12/703* (2013.01)
- *H04L 1/18* (2006.01)
- *H04W 84/18* (2009.01)
- *H04L 1/00* (2006.01)

(52) U.S. Cl.
CPC .............. *H04L 45/26* (2013.01); *H04L 45/28* (2013.01); *H04W 40/02* (2013.01); *H04L 2001/0092* (2013.01); *H04W 84/18* (2013.01)

(56) References Cited

U.S. PATENT DOCUMENTS

| | | | |
|---|---|---|---|
| 2005/0036486 A1* | 2/2005 | Sahinoglu | H04W 40/28 370/389 |
| 2008/0186984 A1 | 8/2008 | Nakano | |
| 2008/0205312 A1* | 8/2008 | Metke | H04W 40/28 370/310 |
| 2009/0284376 A1* | 11/2009 | Byun | G06K 19/0717 340/572.1 |
| 2010/0037124 A1 | 2/2010 | Hoshi et al. | |
| 2010/0103913 A1* | 4/2010 | Sung | H04W 74/006 370/338 |
| 2010/0302945 A1 | 12/2010 | Leppanen et al. | |
| 2011/0038274 A1 | 2/2011 | Ikemoto et al. | |
| 2011/0075578 A1 | 3/2011 | Kim et al. | |
| 2011/0141932 A1 | 6/2011 | Iwao et al. | |
| 2011/0158099 A1 | 6/2011 | Fujita | |
| 2011/0176416 A1* | 7/2011 | Bhatti | H04N 7/18 370/230 |
| 2011/0176487 A1* | 7/2011 | Zhai | H04L 45/00 370/328 |
| 2012/0106344 A1* | 5/2012 | Chrysos | H04L 69/28 370/236 |
| 2012/0106552 A1 | 5/2012 | Iwao et al. | |
| 2014/0247821 A1* | 9/2014 | Yamada | H04W 40/125 370/338 |

FOREIGN PATENT DOCUMENTS

| | | |
|---|---|---|
| JP | 2008-054303 A | 3/2008 |
| JP | 2008-193543 A | 8/2008 |
| JP | 2009-267532 A | 11/2009 |
| JP | 2010-87701 A | 4/2010 |
| JP | 2010-233187 A | 10/2010 |
| JP | 2010-239176 A | 10/2010 |
| JP | 2011-139284 A | 7/2011 |
| JP | 2012-004831 A | 1/2012 |
| WO | WO 2009/130918 A1 | 10/2009 |
| WO | WO 2011/013165 A1 | 2/2011 |

OTHER PUBLICATIONS

International Written Opinion mailed Nov. 27, 2012 for PCT/JP2012/006969 filed Oct. 31, 2012.

Takero Fukuhara, et al., "Flooding Algorithm with Energy Consumption Reduction by Reducing Redundant Reception of ACK in Sensor Networks", The Transactions of the Institute of Electronics, Information and Communication Engineers (J92-B), No. 5, May 1, 2009, pp. 831-839 with partial English Translation.

Office Action mailed Dec. 1, 2016 in co-pending U.S. Appl. No. 14/278,168.

Office Action mailed Apr. 21, 2016 in co-pending U.S. Appl. No. 14/278,168.

International Search Report issued Mar. 13, 2012 in PCT/JP2011/078719.

Office Action dated Apr. 24, 2017 in Chinese Patent Application No. 201280076178.3 (with English translation).

* cited by examiner

FIG. 3

| ADJACENT NODE | ADDRESS INFORMATION |
|---|---|
| Ne | MAC (e) |
| Na | MAC (a) |
| Nd | MAC (d) |

FIG. 4

| GD | ADDRESS INFORMATION OF GD | NUMBER OF TIMES OF RETRANSMISSION | LD | ADDRESS INFORMATION OF LD |
|---|---|---|---|---|
| GW | MAC (GW) | 5 | Ne | MAC (e) |
| | | | Na | MAC (a) |
| | | | Nd | MAC (d) |

FIG. 5A

| ADJACENT NODE | ADDRESS INFORMATION |
|---|---|
| Na | MAC (a) |
| Nd | MAC (d) |

FIG. 5B

| ADJACENT NODE | ADDRESS INFORMATION |
|---|---|
| Nd | MAC (d) |

FIG. 6

| NUMBER OF SEARCHED PATHS | NUMBER OF TIMES OF RETRANSMISSION |
|---|---|
| 1 | 5 |
| 2 | 3 |
| 3 | 2 |
| 4 AND MORE | 1 |

FIG. 7

| ADDRESS INFORMATION OF GS | ADDRESS INFORMATION OF LS | FRAME ID | ADJACENT NODE | FLAG |
|---|---|---|---|---|
| MAC (c) | MAC (c) | F1 | Nc | 1 |
| | | | Nb | 1 |
| | | | NY | 0 |

COMMUNICATION CONTROL METHOD, NETWORK SYSTEM, AND COMMUNICATION DEVICE

CROSS-REFERENCE TO RELATED APPLICATION

This application is a continuation application of International Application PCT/JP2012/006969 filed on Oct. 31, 2012 and designated the U.S., the entire contents of which are incorporated herein by reference.

FIELD

The technique disclosed herein relates to a packet communication technique.

BACKGROUND

In recent years, an autonomous distributed network such as an ad hoc network has been used, in which communication devices are coupled directly to each other to establish a network without using a network infrastructure with a base station, an access point, and the like.

In the autonomous distributed network, many communication devices are coupled to each other using a technique used for wireless connections of computers, personal digital assistants (PDAs), mobile phone terminals, and the like without an access point, for example. In addition, in the autonomous distributed network, networks are autonomously established for addition and removal of communication devices serving as nodes. Thus, an effort to be made in setting the network may be reduced, and if a large number of nodes are provided or the configuration of the network is changed at a certain frequency, the autonomous distributed network is effective.

In the network, when a data packet is transmitted from a certain node through a relay node toward a target node, the data packet may not arrive at the target node depending on the state of wireless communication between the nodes forming a transfer path.

In order to improve the arrival rate, there is the following technique. In the technique, if a data frame that specifies a certain adjacent node as a relay node is transmitted and an ACK frame is not received from a global destination node within a certain time period after the transmission of the data frame, the data frame is retransmitted.

As related art, International Publication Pamphlet No. WO2011/013165 is known for example.

SUMMARY

According to an aspect of the invention, a communication control method to be executed by a communication device, includes: transmitting, to one or more communication devices coupled to the communication device, a packet in which a destination is set; and determining, based on the number of paths that are among paths extending through the one or more communication devices to the destination and through which a response to the packet is received from the destination, the number of times of retransmission in the transmission of another packet to the destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary data configuration of a link table.

FIG. 4 illustrates an exemplary data configuration of a routing table.

FIGS. 5A and 5B illustrate exemplary data configurations of a searched path table.

FIG. 6 illustrates an exemplary data configuration of a reference table.

FIG. 7 illustrates an exemplary data configuration of a transfer record table.

DESCRIPTION OF EMBODIMENTS

In order to improve the arrival rate of data packets, it is effective to execute a retransmission process in the same manner as a conventional technique if a failure of the transmission of a data packet is detected. However, if an increase in a load to be applied to the overall network due to the retransmission process is considered, it is not desirable to uniformly set the numbers of times of the retransmission process. Thus, the numbers of times of the retransmission process are requested to be autonomously set by nodes. The same applies to a centralized management network other than autonomous distributed networks such as ad hoc networks.

An object of the embodiments is to cause nodes to autonomously set the numbers of times of a retransmission process in a process of transmitting a packet.

The quality of communication depends on a connection state (topology) of a network. Thus, the inventors have found out that when the number of times of retransmission is to be set, it is effective to set the number of times of the retransmission in consideration of the topology. In a present embodiment, nodes determine the numbers of times of the retransmission based on the actual topology without recognizing the state of the topology of the overall network. Especially, in the present embodiment, the determination of the number of times of the retransmission in a process of transmitting a data packet in an autonomous distributed network such as an ad hoc network is descried with reference to the accompanying drawings.

Figure 1:
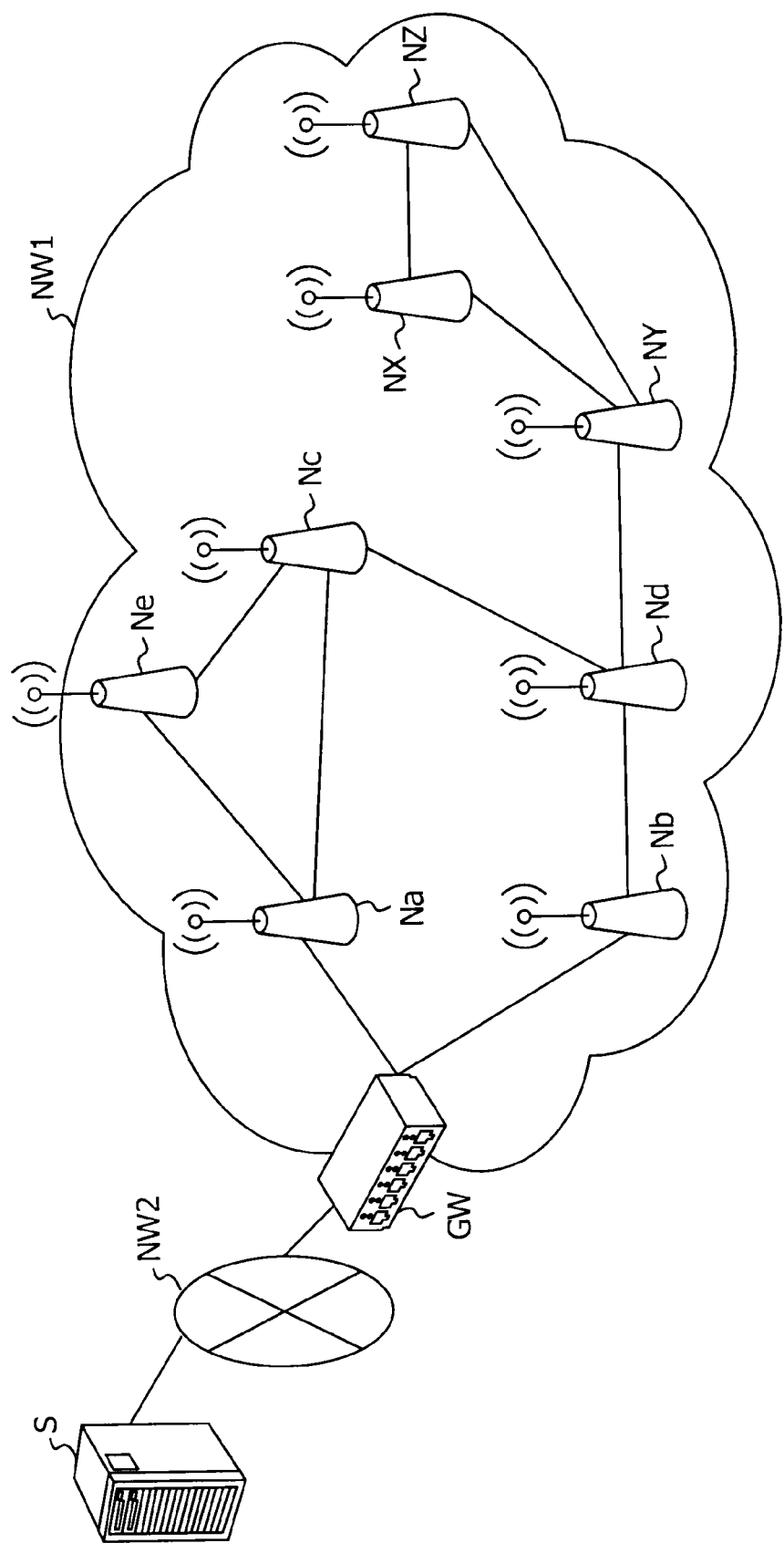
FIG. 1 illustrates an example of a network system according to an embodiment.

FIG. 1 is an explanatory diagram illustrating an example of a network system according to the embodiment. The network system is a system forming an autonomous distributed network. In addition, the network system according to the embodiment includes a plurality of communication devices and a relay device. In addition, the network system may include a managing device configured to manage the overall network system.

Nodes Na to Ne and NX to NZ illustrated in FIG. 1 are an example of the communication devices. In addition, a gateway GW is an example of the relay device. A server S is an example of the managing device. The nodes are referred to as nodes N except in a case where the nodes are distinguished from each other.

The nodes N are computers that each have a wireless communication function. For example, the nodes N are PDAs, mobile phone terminals, or the like. In addition, the gateway GW is a computer configured to relay communication between the nodes N and the server S. Specifically, the gateway GW is the computer able to transmit and receive information based on a protocol of an ad hoc network NW1 and information based on a protocol of a normal network NW2. The server S is a computer configured to manage the nodes N and the gateway GW.

First, the ad hoc network that is a type of autonomous distributed network, and normal packet communication in the ad hoc network, are described with reference to FIG. 1.

The nodes N execute communication using the ad hoc network NW1. A node N transmits a packet to other nodes N able to communicate directly with the interested node. Then, the other nodes N transfer the received packet to a global destination. For the transmission and reception of the packet, routing information generated by the nodes N is referenced. The routing information is generated by communication of a hello packet or the like between the interested node N and the other nodes N and includes information on paths extending from the interested node to the global destination. Details are described later.

In this manner, the packet is repeatedly transferred between nodes able to communicate directly with each other and arrives at the global destination. For example, if a node N transmits data to the gateway GW, a data packet that contains the data to be transmitted is transferred one or multiple times and thereby arrives at the gateway GW.

The server S and the gateway GW are coupled to each other through the normal network NW2 such as the Internet, a LAN, or a WAN. Thus, the gateway GW relays data between the nodes N and the server S by executing protocol conversion on information between the ad hoc network NW1 and the normal network NW2.

If a node N detects a failure of the transmission of a packet to a global destination, the node N executes a process of retransmitting the packet. The retransmission process is a process of transmitting the data packet containing data to be transmitted a predetermined number of times or less. If the data packet is returned to the interested node N by backtracking or if a global destination does not provide a response to the data packet regardless of the fact that the data packet requests the response to the data packet, the node N detects the failure of the transmission of the data packet.

In the present embodiment, the nodes N each request one of nodes able to communicate directly with the interested node to transfer a data packet. If the retransmission process is repeated the predetermined number of times and the transmission of the data packet is not successful, the interested node selects another node. Hereinafter, nodes that are able to communicate directly with an interested node are referred to as adjacent nodes. It is sufficient if the adjacent nodes are able to communicate directly with the interested node, and the adjacent nodes may not be physically adjacent to the interested node.

In addition, in the present embodiment, the nodes N each transmit and receive test packets in order to recognize a topology of the ad hoc network NW1, separately from the transmission and reception of the aforementioned data packet. The test packets are packets to be used to search paths extending from the interested node to a global destination. Specifically, the nodes N each use test packets to search paths extending from the interested node to the global destination within the ad hoc network NW1.

The test packets are transmitted toward adjacent nodes able to communicate directly with the interested node and are transferred to the set global destination. Then, when receiving a response to a test packet from the global destination, each node N may each recognize that a path extending through an adjacent node that is a destination of the test packet exists as a path to the global destination.

A process of searching a path extending from a node Nd to the gateway GW that is a global destination is described with reference to FIG. 1. In the path search process, the node Nd transmits a test packet to nodes Nb, Nc, and NY able to communicate with the interested node Nd. The adjacent nodes Nb, Nc, and NZ each transfer the test packet to adjacent nodes able to communicate directly with the interested node.

However, a path through which the test packet does not arrive at the global destination due to a failure of the transfer of the test packet during the transfer may exist depending on radio wave reception or on whether or not an adjacent node exists. When receiving the test packet, the global destination transmits a response to the test packet.

For example, when the test packet transmitted by the node Nd to the node Nb arrives at the gateway GW or the global destination and is received by the gateway GW, the gateway GW transmits a response to the test packet to the node Nd that is a global destination of the response. Specifically, the gateway GW has a communication unit configured to receive the test packet and transmit a response to the test packet.

Then, the node Nd receives the response and thereby recognizes that the node Nd is able to transmit a packet to the gateway GW through the node Nb. Recognizing that a packet is able to be transmitted to a global destination through any adjacent node X is referred to as recognizing a path extending through the adjacent node X.

The test packet transmitted by the node Nd to the node Nb is transferred to the adjacent node NX or NZ for the node NY. In the example illustrated in FIG. 1, however, the test packet is returned to the node NY from the node NX or NZ. Thus, the transfer of the test packet through the node NY fails due to the return of the test packet to the node Nd or a timeout. Thus, the node Nd does not receive, from the gateway GW, a response to the test packet transferred through the node NY.

Then, the nodes N determine the numbers of times of the retransmission process based on the numbers of paths recognized by the path search process. Specifically, the numbers of the paths recognized by the path search process are information in which the state of the topology is reflected. Thus, by determining the numbers of times of the retransmission process based on the numbers of the paths, the nodes N may determine the numbers of times of the retransmission process so as to ensure that the state of the topology is reflected in the determined numbers. For example, as the numbers of the paths are larger, the numbers of times of the retransmission process are determined to be smaller. The number of times of the retransmission process is the number of times of the process of repeatedly retransmitting a packet to adjacent nodes for an interested node.

As descried above, the nodes N may determine the numbers of times of the retransmission process so as to ensure that the actual state of the topology is reflected in the determined numbers. Thus, in the actual data packet communication, it is possible to inhibit the retransmission process from being repeatedly executed the same number of times regardless of the fact that connection states of networks for the nodes are different.

For example, if a certain node has many paths to a global destination, it is possible to inhibit a data packet from being repeatedly retransmitted to one of the paths an excessive number of times. Specifically, if the data packet is not correctly transmitted, wasteful consumption of a wireless resource is reduced by early switching a path.

On the other hand, if the number of the paths extending from the certain node to the global destination is small, the number of times of the retransmission process may be set to be large. Specifically, a probability that the packet arrives at the global destination may be increased.

In the example illustrated in FIG. 1, the single gateway GW is installed in the ad hoc network NW1, but a plurality of gateways GW may be installed in the single ad hoc network NW1.

In addition, although the single ad hoc network NW1 exists in the example illustrated in FIG. 1, a plurality of ad hoc networks may be included. If the plurality of ad hoc networks is included, at least one gateway GW is included in each of the plurality of ad hoc networks.

Figure 2:
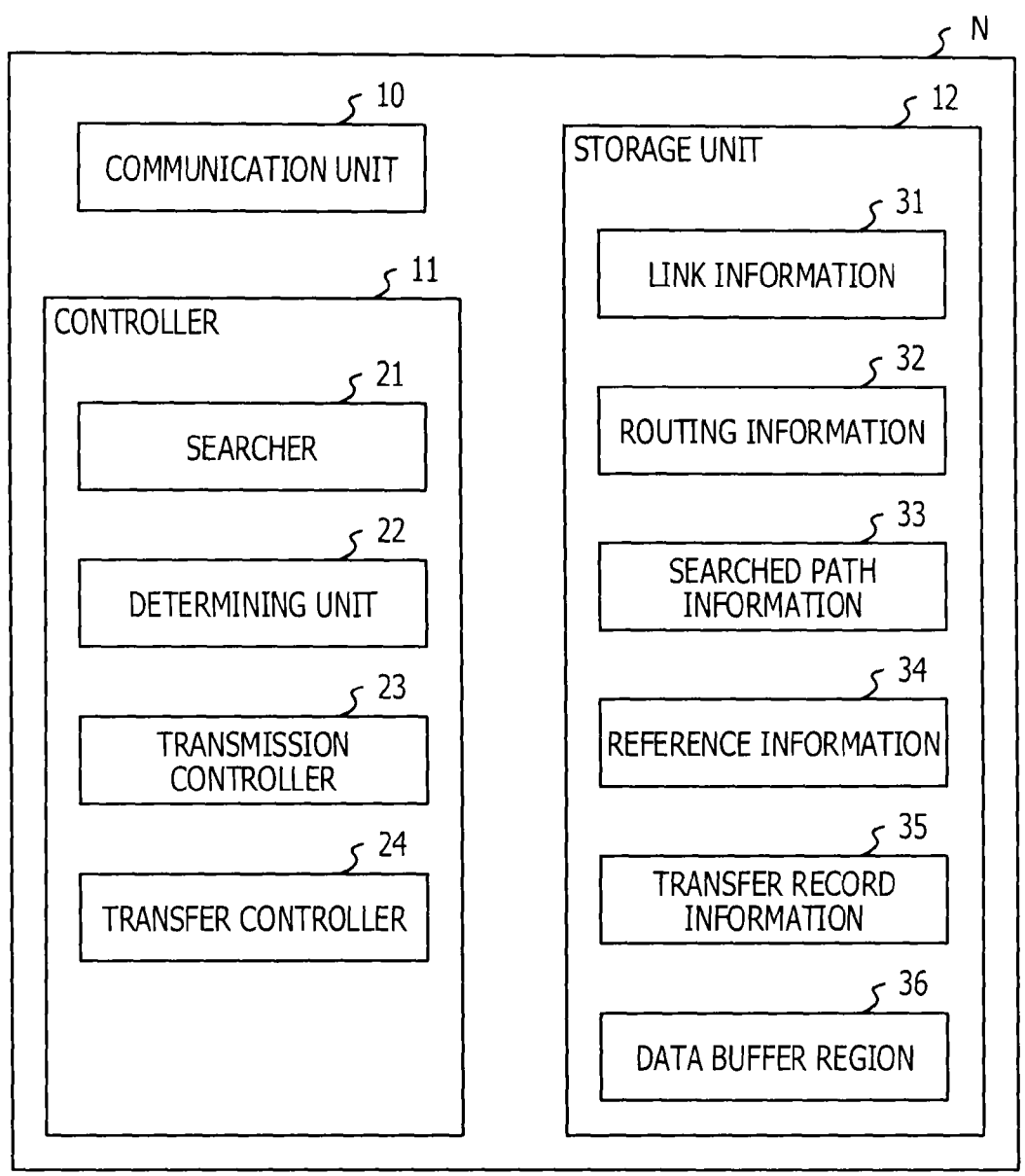
FIG. 2 is a functional block diagram of a node N.

Next, a functional configuration of a node N that is an example of the communication devices is described. FIG. 2 is a functional block diagram of the node N.

The node N includes a communication unit 10, a controller 11, and a storage unit 12. The communication unit 10 is a processing unit configured to communicate with another device. For example, the communication unit 10 transmits and receives a packet to and from another node. In the present embodiment, packets such as a hello packet, a data packet, and a test packet are communicated.

The controller 11 is a processing unit configured to control various processes. The controller 11 includes a searcher 21, a determining unit 22, a transmission controller 23, and a transfer controller 24. When the node N executes the path search process, the searcher 21 operates. In addition, when the node N executes the process of determining the number of times of the retransmission process, the determining unit 22 operates. Furthermore, when the node N executes the process of transmitting a data packet, the transmission controller 23 operates.

When the node N receives a test packet based on the path search process executed on another node N, the node N executes the process of transferring the test packet. When the node N executes the process of transferring the test packet, the transfer controller 24 operates.

The searcher 21 is a processing unit configured to search a path. For example, the searcher 21 generates a test packet. In addition, the searcher 21 controls the transmission, to be executed by the communication unit 10, of the test packet. Then, the searcher 21 counts the number of responses received by the communication unit 10. In the present embodiment, the number of the responses is the same as the number of searched paths.

The determining unit 22 determines, based on the topology of the network, the number of times of the retransmission process in the transmission of a data packet from the interested node to each global destination. For example, the determining unit 22 determines the number of times of the retransmission process based on the number of paths searched by the searcher 21.

The transmission controller 23 is a processing unit configured to control the transmission of a data packet. For example, the transmission controller 23 generates a data packet. In addition, if the transmission controller 23 detects a failure of the transmission of the data packet, the transmission controller 23 executes the process of retransmitting the data packet the number, determined by the determining unit 22, of times or less.

The transfer controller 24 is a processing unit configured to transfer the test packet to adjacent nodes for the interested node. For example, if the communication unit 10 receives a test packet from another node, the transfer controller 24 sequentially transmits the test packet to the adjacent nodes for the interested node.

The storage unit 12 is configured to store information of various types. The storage unit 12 stores link information 31, routing information 32, searched path information 33, reference information 34, and transfer record information 35. The storage unit 12 has a data buffer region 36. In addition, the storage unit 12 may store key information for cryptographic communication.

The link information 31 includes information of the adjacent nodes able to communicate directly with the interested node. For example, the link information 31 is stored as a link table in the storage unit 12. The link information is generated by the controller 11 using a conventional method.

FIG. 3 illustrates an exemplary data configuration of the link table. The link table stores adjacent nodes and address information of the adjacent nodes, while the adjacent nodes are associated with the address information of the adjacent nodes in the link table. The adjacent nodes are information identifying the nodes able to communicate directly with the interested node. The address information is information on addresses of the corresponding adjacent nodes. The link table may include information on the strength of communication between the adjacent nodes and the interested node.

The routing information 32 includes information on paths to be used for the transmission of a data packet. For example, the routing information 32 is stored as a routing table in the storage unit 12. The routing information 32 is generated by the controller 11 using a conventional method.

FIG. 4 illustrates an exemplary data configuration of the routing table. For each global destination (GD), the GD, address information of the GD, local destinations (LDs), and address information of the LDs are associated with each other and stored. In addition, in the present embodiment, the number, determined based on the number of paths, of times of the retransmission process is stored for each global destination in the routing table.

The GD is information identifying a device that is the global destination. The address information of the GD is information on an address of the global destination. The number of times of the retransmission process is the number of times of the retransmission process to be executed in the process of transmitting a data packet to the interested global destination. The LDs are information identifying the next local destinations located on a transmission path provided for the data packet and extending from the interested node to the global destination. The address information of the LDs is information on addresses of the local destinations.

Priorities of the paths extending through the adjacent nodes are calculated based on the strength of communication between the plurality of adjacent nodes listed in the link table and the interested node and the number of hops between the interested node and the global destination. In the present embodiment, adjacent nodes with high priorities are set as a predetermined number of LDs in the routing table. The routing table may store the priorities associated with the LDs.

The searched path information 33 includes information on the paths searched by the path search process. For example, the searched path information 33 is stored as a searched path table in the storage unit 12. The searched path information 33 may be temporarily generated information.

FIGS. 5A and 5B illustrate exemplary data configurations of the searched path table. The searched path table stores an adjacent node located on a searched path and address information of the adjacent node, while the adjacent node is associated with the address information in the searched path table.

The adjacent node is information of the adjacent node that is a source of a test packet when the adjacent node receives a response to the test packet from a global destination. The address information is information on an address of the interested adjacent node.

FIG. 5A illustrates an example of the searched path table generated as a result of causing the node Nc to execute the process of searching a path to the "GW" that is the global destination. When the node Nc receives a response to a transmitted test packet in which the node Na is set as an LD, "Na" is stored as an adjacent node and "MAC(a)" is stored as address information.

The test packet includes a frame ID uniquely identifying the test packet. The response includes a frame ID that identifies the response to the test packet. Thus, the node Nc may separately manage LDs to which test packets corresponding to frame IDs are transmitted, and thus the node Nc may recognize adjacent nodes through which searched paths extend.

In the example illustrated in FIG. 5A, the node Nc receives a response to a transmitted test packet in which the node Nd is set as an LD, and thus a record in which "Nd" is set as an adjacent node and "MAC(d)" is set as address information is also generated in the searched path table. In this manner, the searched path table illustrated in FIG. 5A indicates that the node Nc has searched two paths in the ad hoc network NW1.

FIG. 5B illustrates the searched path table when the node NY executes the process of searching a path to the global destination "GW". FIG. 5B indicates that the node NY has searched the path extending through the node Nd. In this manner, the searched path table illustrated in FIG. 5B indicates that the node NY has searched the single path in the ad hoc network NW1.

Next, the reference information 34 includes information to be used to determine the number of times of the retransmission process based on the number of searched paths. For example, the reference information 34 is stored as a reference table in the storage unit 12. The smaller the number of paths, the larger the number of times of the retransmission process. Alternatively, the larger the number of paths, the smaller the number of times of the retransmission process.

The reference information 34 may be a function of the number of searched paths and the number of times of the retransmission process, instead of the table. The function represents an inverse proportion, a proportion with a negative slope, or the like.

FIG. 6 illustrates an exemplary data configuration of the reference table. The numbers of searched paths and the numbers of times of the retransmission process are stored in the reference table, while the numbers of the searched paths are associated with the numbers of the times of the retransmission process in the reference table. Relationships between the numbers of the searched paths and the numbers of the times of the retransmission process are set by an administrator of the server S. For example, in the example illustrated in FIG. 6, if the number of searched paths is "1", "5" is set as the number of times of the retransmission process.

For example, the relationships between the numbers of the searched paths and the numbers of the times of the retransmission process may be set based on the size of the ad hoc network NW and service level agreement (SLA). A default value of the number of times of the retransmission process is set for the number of paths to be secured in a network defined in the SLA.

If the number of searched paths is larger than the number of paths to be secured, the number of times of the retransmission process is set to a value smaller than the default value. On the other hand, if the number of the searched paths is, even temporarily, smaller than the number of paths to be secured, the number of times of the retransmission process is set to a value larger than the default value.

The transfer record information 35 includes information on the transfer of test packets. For example, the transfer record information 35 is information provided for each of the test packets and to be used to recognize whether the test packets have been transferred to adjacent nodes. The transfer record information 35 is stored as a transfer record table in the storage unit 12. The transfer record table may be temporarily stored during a process of transferring a test packet.

FIG. 7 is a diagram illustrating an exemplary data configuration of the transfer record table. In the transfer record table, address information of a global source (GS) of a test packet, address information of a local source (LS), a frame ID, adjacent nodes, and flags are associated with each other and stored. A transfer record table is generated for each of combinations of GSs and frame IDs.

The address information of the GS is information on an address of a node that executes the path search process or has generated the test packet. The address information of the LS is information on an address of a node that is a source of the test packet. Specifically, the LS is the node that is the source in communication between two nodes included in a path through which the interested test packet is transferred from the GS to a GD.

The frame ID is information set for the GS and identifying the test packet. The adjacent nodes are information identifying the adjacent nodes for the interested node. Information of the adjacent nodes is set in the transfer record table based on the link information of the interested node.

In the example illustrated in FIG. 7, the information of the adjacent nodes may be acquired from the routing table and the link table. In this case, the nodes N reference the routing table and set adjacent nodes (LDs) corresponding to the global destination of the test packet as the adjacent nodes of the transfer record table. Then, the nodes N transfer the test packet in order from an adjacent node acquired from the routing table on a priority basis.

The flags are information indicating whether the test packet has been transferred to each of the adjacent nodes. For example, a flag "1" indicates that the transfer has been executed, while a flag "0" indicates that the transfer is not executed.

FIG. 7 illustrates a transfer record table of the node Nd and an example in which the node Nd receives the test packet with a frame ID "f1" from the node Nc. When receiving the interested test packet, the node Nd generates the transfer record table related to the frame ID "F1" and the node Nc that is the GS.

The node Nd stores, in the transfer record table, "MAC (c)" that is an address of the GS, "MAC(c)" that is an address of the LS, and the frame ID "F1". It is assumed that the node Nd is an adjacent node for the node Nc and that the node Nc is the GS and is also the LS.

If adjacent nodes for the interested node Nd are the nodes Nc, Nb, and NY, Nc, Nb, and NY are stored as the adjacent nodes. First, flags of records are set to "0". The flags are updated to "1" when the transfer process is executed. FIG. 7 indicates that the transfer process is executed on the node Nb. For the node Nc that is the LS, a flag is set to "1" in advance. Specifically, the adjacent node that is the LS is excluded from destinations to which the test packet is transferred, except in the case where the test packet is returned.

The data buffer region 36 is a region for temporarily storing a data packet. When the transmission controller 23 executes the retransmission process, a data packet stored in the data buffer region 36 is retransmitted.

Figure 8:
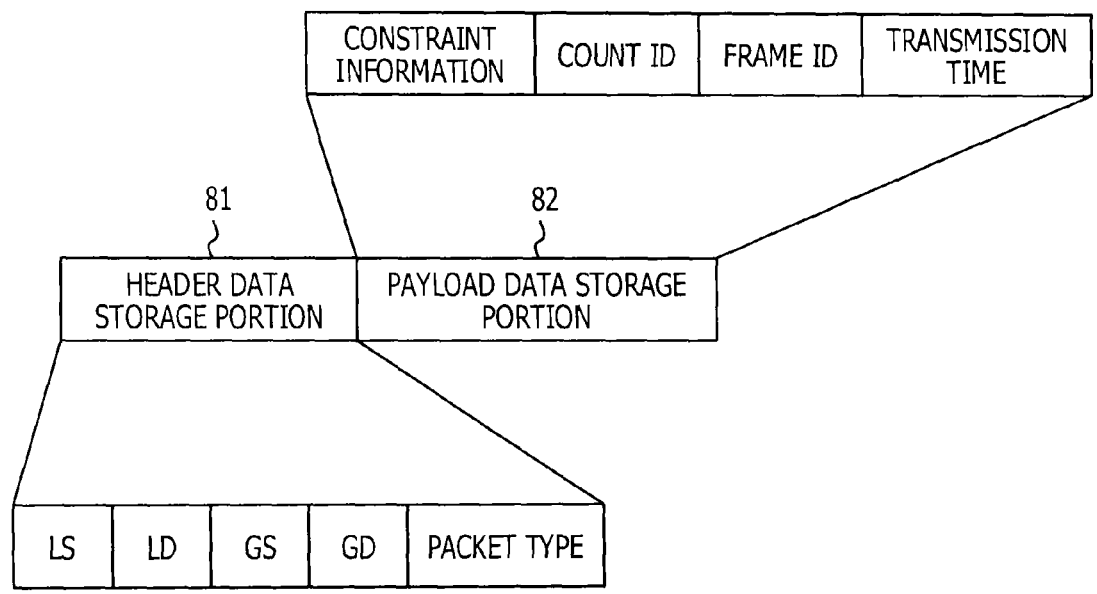
FIG. 8 illustrates an exemplary data configuration of a test packet.

A data configuration of the test packet is described with reference to FIG. 8. FIG. 8 illustrates an exemplary data configuration of the test packet. The test packet is generated by the searcher 21.

The test packet includes a header data storage portion 81 and a payload data storage portion 82. Header data is stored in the header data storage portion 81. Payload data is stored in the payload data storage portion 82.

The header data includes address information of an LS, address information of an LD, address information of a GS, address information of a GD, and information representing a packet type. The packet type is information representing the type of the packet. If the packet is a test packet, the packet type is information representing the test packet.

The searcher 21 sets, as the GS, an address of the interested node that has generated the test packet. The searcher 21 sets, as the GD, an address of a global destination that is an end point of a path. In addition, an address of a source in communication between the two nodes is set as the LS, while an address of a destination is set as the LD. The LS and the LD are rewritten during the transfer of the test packet.

The payload data of the test packet is information containing constraint information, a count ID, a frame ID, and a transmission time. The constraint information is information of adjacent nodes for the node N that generates the test packet. The count ID is information representing the order that the path is subjected to the path search process for the test packet. The frame ID is information uniquely identifying the test packet. The transmission time is information on a time when the GS transmits the test packet.

For example, it is assumed that the node Nc transmits, to the adjacent node Nd at 10:00:00, a test packet in which the gateway GW is set as a global destination. In this case, header data that includes information in which "an address of the LS=an address of the node Nc", "an address of the LD=an address of the node Nd", "an address of the GS=the address of the node Nc", "an address of the GD=an address of the gateway GW", and "the packet type=the test packet" is set in the header data storage portion 81.

In addition, it is assumed that the adjacent nodes for the node Nc are the nodes Na, Ne, and Nd, the test packet is used to search the first path, and F1 is generated as the frame ID. In this case, payload data that includes information in which "the constraint information=the node Na, the node Ne, and the node Nd", "the count ID=1", "the frame ID=F1", and "the transmission time=10:00:00" is set in the payload data storage portion 82.

The constraint information is described below. A node that receives the test packet references the constraint information and transfers the test packet to a node that is among the adjacent nodes for the interested node and is not any of the nodes set in the constraint information.

In the example illustrated in FIG. 1, when the node Ne receives the test packet from the node Nc, information of the nodes Na, Nd, and Ne that are the adjacent nodes for the node Nc is included in the constraint information. Thus, the node Ne does not transfer the test packet to the node Na that is among the nodes Na and Nc and included in the constraint information.

Although the node Ne examines the transfer to the adjacent node Nc, the node Nc is the LS and the flag is set to "1" in advance in the transfer record table. Thus, in this case, the node Nc determines that a node that is a transfer destination does not exist, and the node Nc returns the test packet to the node Nc that is the LS.

Thus, in the path search process disclosed in the present embodiment, a path that extends from the node Nc through the node Ne illustrated in FIG. 1 to the gateway GW is not searched by the path search process.

Figure 9:
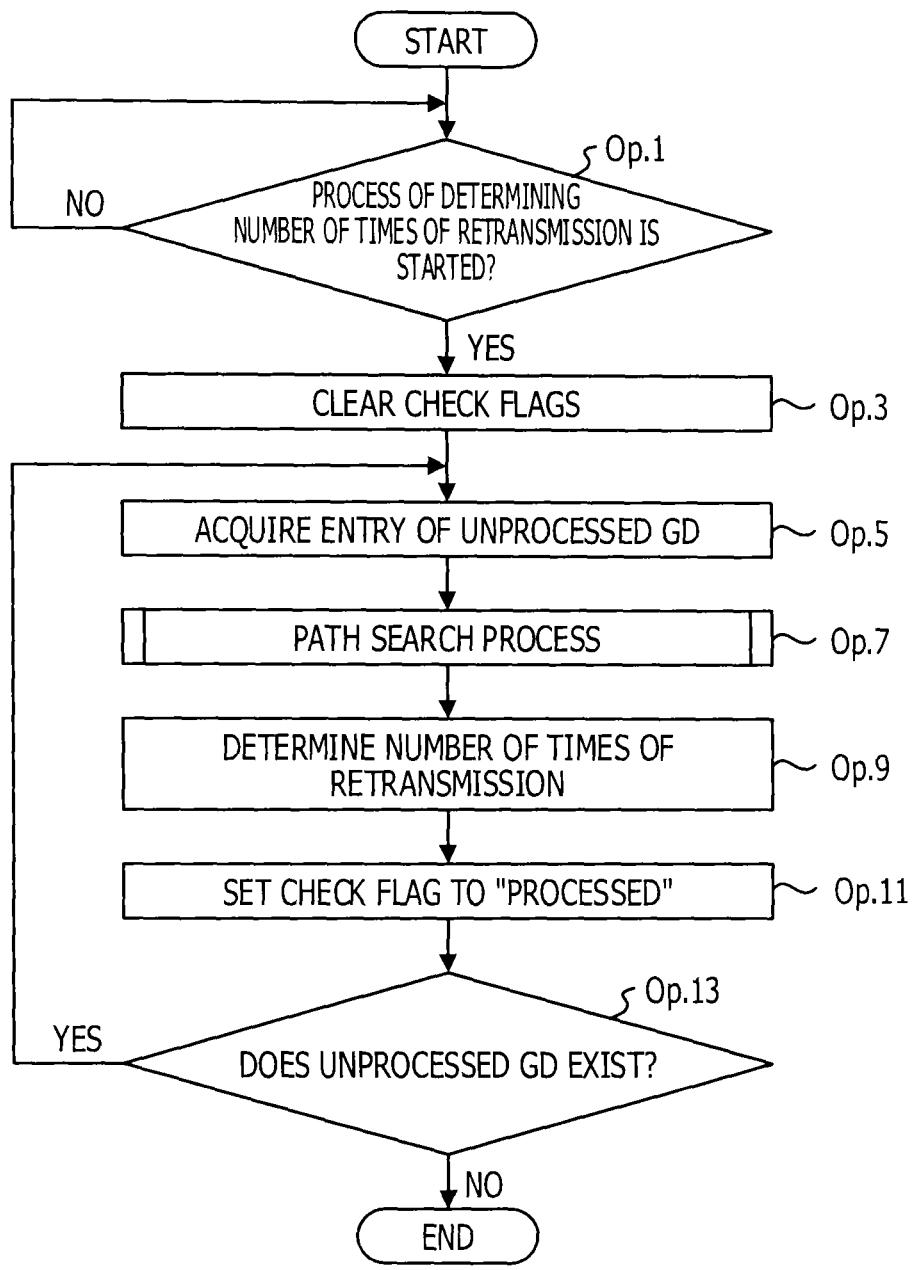
FIG. 9 is a flowchart of a process of determining the number of times of retransmission.

Next, the process of determining the number of times of the retransmission process by a node N is described. FIG. 9 is a flowchart of the process of determining the number of times of the retransmission process.

The determining unit 22 determines whether or not the process of determining the number of times of the retransmission process is to be started (in Op. 1). For example, the determining unit 22 determines whether or not a predetermined time elapses and thereby determines whether or not the process is to be started. In addition, if the presence of a new node able to communicate directly with the interested node is detected or if the update of the routing table is detected, the determining unit 22 determines that the process of determining the number of times of the retransmission process is to be started.

If the determining unit 22 determines that the process of determining the number of times of the retransmission process is not to be started (No in Op. 1), the determining unit 22 stands by until the determining unit 22 determines that the process is to be started. On the other hand, if the determining unit 22 determines that the process of determining the number of times of the retransmission process is to be started (Yes in Op. 1), the determining unit 22 clears check flags for global destinations GDs (in Op. 3).

The check flags are set for the global destinations GDs stored in the routing table and represent whether or not the numbers of times of the retransmission process have been determined. In the routing table illustrated in FIG. 4, the check flags may be associated with the GDs and stored. In addition, the determining unit 22 may limit the GDs to GDs communicating at high frequencies or to important GDs, clear the check flags, and thereby limit the GDs to be subjected to the process of determining the number of times of the retransmission process.

Next, the determining unit 22 acquires an entry of an unprocessed GD from the routing table (in Op. 5). Next, the determining unit 22 requests the searcher 21 to execute the path search process. The request to execute the path search process includes information of the GD to be subjected to the process of the number of times of the retransmission process.

Then, the searcher 21 executes the path search process (in Op. 7). Details are described later. When the searcher 21 terminates the path search process, the determining unit 22 determines, based on the number of searched paths, the number of times of the retransmission process in the process of transmitting a data packet to the GD to be subjected to the process (in Op. 9). For example, the determining unit 22 determines the number of times of the retransmission process by referencing the reference table. The determined number of times of the retransmission process is stored in the routing table.

Then, the determining unit 22 sets a check flag corresponding to the GD to be subjected to the process to a value representing "processed" (in Op. 11). Then, the determining unit 22 determines whether or not an unprocessed GD exists among the GDs for which the check flags have been cleared in Op. 3 (in Op. 13).

If the unprocessed GD exists (Yes in Op. 13), the determining unit 22 executes Op. 5 on the unprocessed GD. On the other hand, if the unprocessed GD does not exist (No in Op. 13), the determining unit 22 terminates the process of determining the number of times of the retransmission process.

Figure 10:
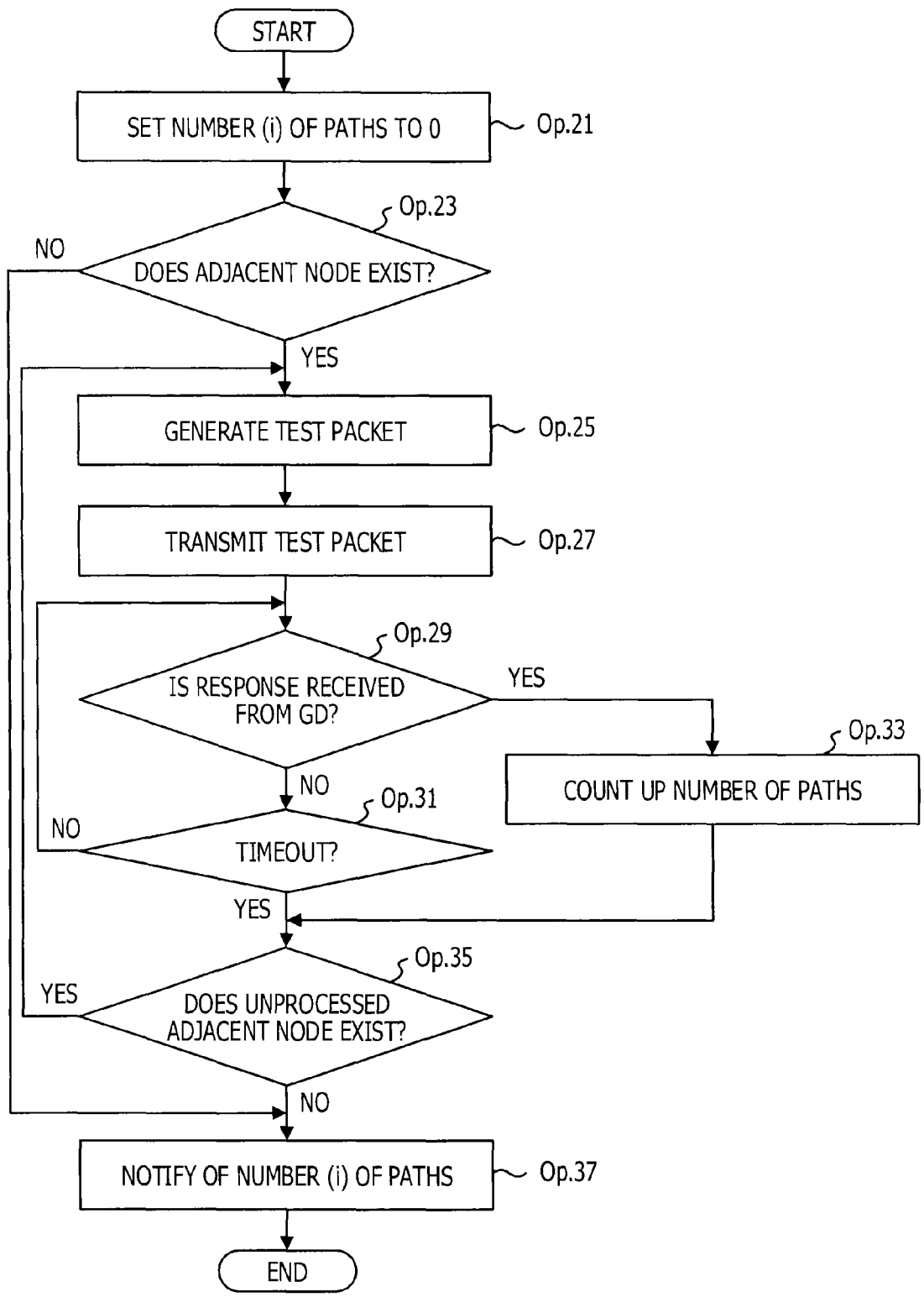
FIG. 10 is a flowchart of a path search process.

Next, the path search process is described. FIG. 10 is a flowchart of the path search process.

When receiving the request to execute the path search process from the determining unit 22, the searcher 21 sets, to 0, the number (i) of paths extending to the GD to be subjected to the process of determining the number of times of the retransmission process (in Op. 21). Then, the searcher 21 references the link table and determines whether or not an adjacent node for the interested node exists (in Op. 23). The determination of whether or not the adjacent node exists may be made by referencing the routing table, instead of the link table.

If the adjacent node does not exist (No in Op. 23), the searcher 21 causes the process to proceed to Op. 37. On the other hand, if the adjacent node exists (Yes in Op. 23), the searcher 21 generates a test packet (in Op. 25).

Similarly to the process of determining the number of times of the retransmission process, the searcher 21 manages check flags for adjacent nodes registered in the link table in the path search process. The searcher 21 sequentially treats, as nodes to be processed, adjacent nodes for which check flags represent that the adjacent nodes are yet to be processed.

In Op. 25, the searcher 21 generates a count ID. The count ID is a value obtained by adding 1 to the number (i) of paths. In addition, the searcher 21 generates frame IDs uniquely identifying the test packets. Then, the searcher 21 generates constraint information containing the adjacent nodes registered in the link table. Then, the test packets that include the generated information are generated.

In addition, the searcher 21 sets an address of the GD to be subjected to the process of determining the number of times of the retransmission process as the address of the GD in the header data storage portion 81. In addition, the searcher 21 sets the address of the interested node as the address of the GS and the address of the LS. Furthermore, the searcher 21 sets, as addresses of LDs, addresses of the adjacent nodes to be subjected to the path search process.

Next, the communication unit 10 transmits the test packet to the LD under control by the searcher 21 (in Op. 27). Then, the searcher 21 determines whether or not the communication unit 10 receives a response from the GD (in Op. 29).

If the communication unit 10 receives the response from the GD (Yes in Op. 29), the searcher 21 counts up the number (i) of paths (in Op. 33). Specifically, the searcher 21 adds 1 to the number (i) of paths. Then, the process proceeds to Op. 35.

On the other hand, if the communication unit 10 does not receive the response (No in Op. 29), the searcher 21 determines whether or not a time that elapses after the transmission of the test packet is equal to or longer than a threshold (in Op. 31). Specifically, the searcher 21 determines whether or not a timeout occurs.

If the timeout does not occur (No in Op. 31), the searcher 21 executes Op. 29 again. If the timeout occurs (Yes in Op. 31) or if the number of paths is counted up (in Op. 33), the searcher 21 updates a check flag for the adjacent node to be subjected to the process to "processed" and determines whether or not an unprocessed adjacent node exists (in Op. 35).

If the unprocessed adjacent node exists (Yes in Op. 35), the searcher 21 executes Op. 25. On the other hand, if the unprocessed adjacent node does not exist (No in Op. 35), the searcher 21 notifies the determining unit 22 of the number of paths (in Op. 37).

The number of times of the retransmission process is determined by the aforementioned process based on the number of paths that are among paths extending through adjacent nodes for the interested node to the global destination and through which the response is provided from the global destination. Specifically, each node may set the number of times of the retransmission process so as to ensure that the state of the topology of the ad hoc network NW1 is reflected in the set number.

Each node does not recognize the topology of the overall network, but may recognize the presence or absence of a path extending from the interested node to a global destination and recognize the redundancy of the path. Thus, by determining the number of times of the retransmission process based on the presence or absence of the path and the redundancy of the path, the number of times of the retransmission process may be autonomously determined so as to ensure that the state of the topology is reflected in the determined number.

The process of transmitting a data packet by a node N is described below. The transmission controller 23 transmits a data packet to adjacent nodes acquired from the routing table. The transmission controller 23 causes the data packet to be temporarily stored in the data buffer region 36. Then, if the transmission controller 23 detects a failure of the transmission of the data packet, the transmission controller 23 acquires the number, corresponding to a global destination of a test packet, of times of the retransmission process from the routing table.

Then, the transmission controller 23 controls the communication unit 10 and thereby repeats the process of retransmitting the data packet the number of times of the retransmission process. If the retransmission process is repeated until an upper limit on the number of times of the retransmission process and the transmission of the data packet does not succeed, the transmission controller 23 references the routing table and instructs the communication unit 10 to transmit a data packet in which a new adjacent node is set as an LD.

As described above, it may be expected to reduce a load of the network and improve the rate of arrival of data packets by the retransmission process executed based on the number, determined according to the present embodiment, of times of the retransmission process. If the number of searched paths is large and the transmission of a data packet fails due to the fact that the number of times of the retransmission of the data packet to a certain adjacent node is set to a small value, the transmission may be early switched to the transmission of the data packet to another adjacent node.

Thus, even if radio disturbance occurs in a path extending through a certain adjacent node, the path is early switched to another path and a data packet may be tried to be transmitted. For example, by setting the number of times of the retransmission process to a value smaller than the default value, each node may early select a path and execute switching to the selected path.

On the other hand, if the number of confirmed paths is small, it is possible to increase a possibility that a data packet arrives at a global destination by setting, to a large value, the number of times of the process of retransmitting the data packet to a certain adjacent node. For example, by setting the number of times of the retransmission process to a value larger than the default value, each node may improve the rate of arrival of the data packet.

Figure 11:
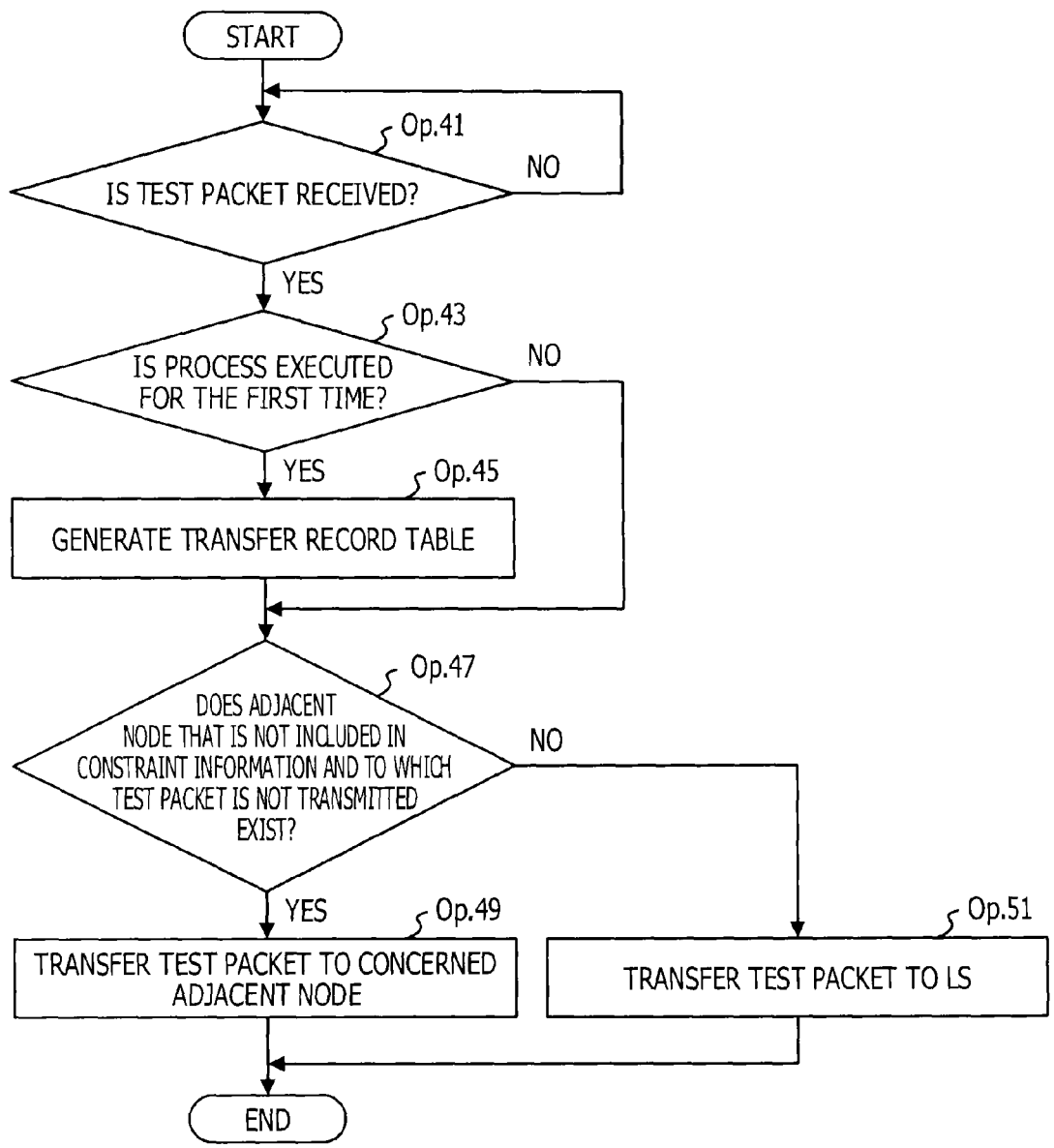
FIG. 11 is a flowchart of a process of transferring a test packet.

Next, the process of transferring a test packet by a node N is described. FIG. 11 is a flowchart of the process or transferring a test packet.

The controller 11 determines whether or not the communication unit 10 receives a test packet (in Op. 41). Specifically, the controller 11 determines whether or not the communication unit 10 receives a packet in which a packet type represents a test packet. Then, if the controller 11 determines that the communication unit 10 receives the test packet (Yes in Op. 41), the controller 11 requests the transfer controller 24 to start the transfer process.

Then, the transfer controller 24 determines whether or not the process of transferring the received packet is executed for the first time (in Op. 43). Specifically, the transfer controller 24 determines whether or not a transfer record table that includes a GS and a frame ID that are included in the received packet exists.

If the process of transferring the received packet is executed for the first time (Yes in Op. 43), the transfer controller 24 references the link table and the routing table and generates a transfer record table (in Op. 45). A flag within the transfer record table is set to "0" representing that a test packet is yet to be transmitted (transferred). However, the transfer controller 24 sets, to "1", a flag for a certain adjacent node that is an LS.

Then, the transfer controller 24 references the transfer record table and determines whether or not an adjacent node that is not a node defined in constraint information and to which a test packet is not transmitted exists (in Op. 47). Specifically, the transfer controller 24 determines whether or not the adjacent node that is not a node defined in the constraint information and for which a flag is set to "0" exists in the transfer record table.

If the concerned adjacent node exists (Yes in Op. 47), the communication unit 10 transfers the test packet to the concerned adjacent node under control by the transfer controller 24 (in Op. 49). The transferred test packet includes an address of the interested node as an address of the LS and includes an address of the concerned adjacent node as an address of an LD. The transfer controller 24 updates the flag of the transfer record table. Specifically, the transfer controller 24 sets, to "1", the frag corresponding to the adjacent node that is a transfer destination.

On the other hand, if the concerned adjacent node does not exist (No in Op. 47), the communication unit 10 transfers the test packet to the LS included in the received test packet under control by the transfer controller 24 (in Op. 51). Specifically, if the node that is the transfer destination does not exist, the communication unit 10 returns the test packet to the LS.

A case where the test packet received in Op. 41 is the test packet returned by the other node in Op. 51 in the transfer process is described below. A transfer record table that corresponds to a GS and a frame ID that are included in the returned test packet is generated when the test packet is previously transferred from the interested node to the other node. Thus, the answer to the determination of Op. 43 is negative. In this case, the test packet is transferred to the other adjacent node by causing the process to proceed to Op. 47.

The test packet to be used to recognize the number of paths is transferred toward a global destination by the aforementioned process. In addition, according to the present embodiment, the test packet may be controlled not to be transferred to an adjacent node for a node that is the GS and executes the process of determining the number of times of the retransmission process.

Figure 12:
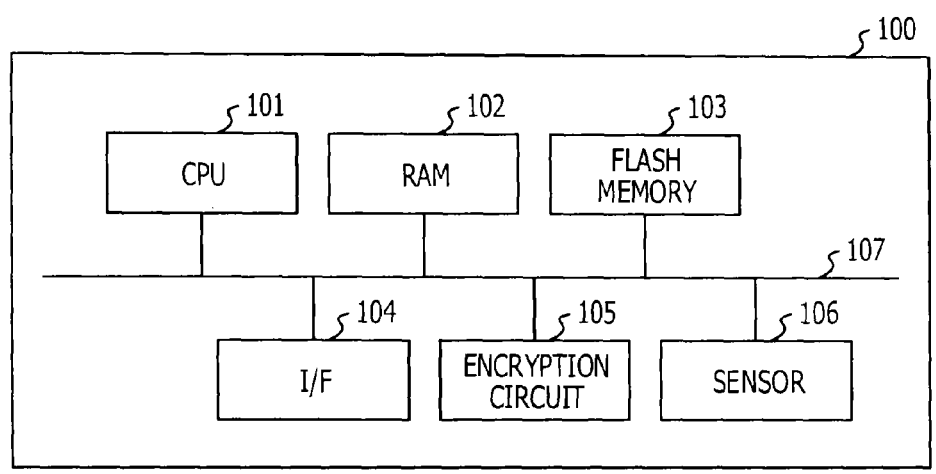
FIG. 12 illustrates an exemplary hardware configuration of a communication device 100.

FIG. 12 illustrates an exemplary hardware configuration of a communication device 100. The nodes N according to the embodiment are an example of communication devices 100. The communication devices 100 each include a central processing unit (CPU) 101, a random access memory (RAM) 102, a flash memory 103, and an interface (I/F) 104. In addition, the communication devices 100 may each include an encryption circuit 105 and a sensor 106. The parts 101 to 106 are coupled to each other through a bus 107.

The CPU 101 controls the overall communication device 100. The CPU 101 functions as the controller 11 by executing a program loaded in the RAM 102.

The RAM 102 is used as a work area of the CPU 101. The flash memory 103 stores the program, the various tables, information detected by the sensor, and key information such as an encryption key. The flash memory 104 is an example of a storage device 15. The program includes a program for causing the communication device 100 to execute the processes of the flowcharts, for example. In addition, a table and information that are temporarily generated may be stored in the RAM 102.

The I/F 104 transmits and receives a packet by multi-hop communication. The I/F 104 functions as the communication unit 10. The I/F 104 is, for example, a communication control circuit such as a network card (NIC) or a network adapter.

The encryption circuit 105 is configured to encrypt data using the encryption key when the data is to be encrypted. For example, if a packet is to be encrypted and transferred, the encryption circuit 105 operates. If the encryption is executed by software, a program that corresponds to the encryption circuit 105 is stored in the flash memory 103 and executed by the CPU 101, and the encryption circuit 105 is not used, for example.

The sensor 106 detects data specific to the sensor 106. For example, the sensor 106 detects data to be measured, such as a temperature, humidity, a water level, precipitation, an air volume, a sound volume, the amount of power used, a time period, a time, and acceleration. The detected data is transmitted as a data packet to the gateway, for example. Then, the server S collects and analyzes the data collected by the gateway GW.

Although the example in which the communication devices 100 are the nodes N forming the ad hoc network is described with reference to FIG. 12, the communication devices 100 may be general-purpose computers. Specifically, the communication devices 100 may be each a computer including a central processing unit (CPU), a read only memory (ROM), a random access memory (RAM), a communication device, a hard disk drive (HDD), an input device, a display device, a medium reading device, and the like. The parts are coupled to each other through a bus.

Hereinafter, modified examples are described.

First Modified Example

In the path search process, when a response to a transferred data packet is received from a global destination, a test packet may not be used and a path that extends through an adjacent node that is a destination of the data packet may be treated to be confirmed. Specifically, if the response to the data packet is set to be returned, the global destination transmits the response that indicates that the data packet has been received. By receiving responses to transferred data packets, the nodes N may confirm that the packets are able to be transmitted to the gateway through adjacent nodes that are LDs of the data packets.

Second Modified Example

The number of times of the process of retransmitting a data packet to a certain global destination may be set based on an importance level of the data packet. For example, in the process of transmitting a data packet containing important data, the number of times of the retransmission process may be controlled and increased. For example, the determining unit 22 references reference information based on the importance level and sets the number of times of the retransmission process based on the importance level.

Third Modified Example

If the number of paths is smaller than a defined number of paths as a result of the execution of the path search process, a node N may transmit, to the gateway GW, an alert packet that causes an alert to be executed. The node N may warn of a possibility that the number of paths may be small and that a failure may occur in later data communication. For example, the administrator of the server S may consider the adjustment of the strength of a radio wave, an increase in the number of nodes, and the like based on the alert.

Fourth Modified Example

In the aforementioned embodiment, a defined number of adjacent nodes are stored as LDs in the routing table. The number of adjacent nodes stored in the routing table, however, is not limited to this. For example, the number of LDs to be stored in the routing table may be changed based on the number of searched paths.

For example, three LDs are normally stored in the routing table, and if the number of searched paths exceeds 3, LDs for the number of the searched paths may be stored. In addition, adjacent nodes that form searched paths may be set as LDs in the routing table on a priority basis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication control method to be executed by a communication device, the communication device being configured to communicate with a destination through a plurality of paths, the plurality of paths between the communication device and the destination being parallel to each other, the communication control method comprising:
   transmitting a packet to each path of the plurality of paths;
   counting a number of paths among the plurality of paths through which a response passes and reaches the communication device from the destination, the response being transmitted by the destination in response to the packet;
   determining an upper limit number of times of retransmission of another packet to the destination as a function of the number of paths, wherein the function represents an inverse proportion or a proportion with a negative slope;
   transmitting the another data packet towards the destination via a first adjacent node on a first path of the plurality of paths;
   if a transmission failure of the another data packet is detected, retransmitting the another data packet until the transmission is successful or the upper limit number of times of retransmission is reached;
   if the upper limit number of times of retransmission is reached, selecting a second adjacent node on a second path of the plurality of paths; and
   transmitting the another data packet towards the destination via the second adjacent node.

2. The communication control method according to claim 1, wherein the packet is a test packet, and
   the another packet is a data packet including data acquired by the communication device from a sensor.

3. The communication control method according to claim 1, wherein
   the packet and the another packet are data packets including data acquired by the communication device from a sensor.

4. A network system comprising:
   a first communication device including a first processor; and
   a second communication device including a second processor, wherein
   the first communication device is configured to communicate with a destination through a plurality of paths, the plurality of paths between the first communication device and the destination being parallel to each other,
   the first processor of the first communication device is configured to:
   transmit a packet to each path of the plurality of paths,
   count a number of paths among the plurality of paths through which a response passes and reaches the first communication device from the destination, the response being transmitted by the destination in response to the packet,
   determine an upper limit number of times of retransmission of another packet to the destination as a function of the number of paths, wherein the function represents an inverse proportion or a proportion with a negative slope,
   transmit the another data packet towards the destination via a first adjacent node on a first path of the plurality of paths, if a transmission failure of the another data packet is detected, retransmit the another data packet until the transmission is successful or the upper limit number of times of retransmission is reached, if the upper limit number of times of retransmission is reached, select a second adjacent node on a second path of the plurality of paths, and transmit the another data packet towards the destination via the second adjacent node, the second communication device is coupled to the first communication device, and the second processor of the second communication device is configured to receive the packet and transfer the received packet to one or more communication devices able to communicate with the second communication device.

5. The network system according to claim 4, further comprising:

a computer including a third processor and configured to manage the first communication device and the second communication device, wherein the first processor of the first communication device is configured to set the computer as the destination, and the third processor of the computer is configured to receive the packet and transmit the response to the packet.

6. The network system according to claim 4, wherein the network system is an autonomous distributed network formed by a plurality of communication devices including the first communication device and the second communication device.

7. The network system according to claim 4, wherein the packet includes constraint information including information identifying one or more communication devices with which the first communication device is able to communicate directly, and the second processor of the second communication device is configured to transfer, based on the constraint information, the packet to a communication device that is not any of the one or more communication devices corresponding to the identification information and is among the one or more communication devices with which the second communication device is able to communicate.

8. The network system according to claim 4, wherein the packet is a test packet, and the another packet is a data packet including data acquired by the first communication device from a sensor.

9. The network system according to claim 4, wherein the packet and the another packet are data packets including data acquired by the first communication device from a sensor.

10. A communication device configured to communicate with a destination through a plurality of paths, the plurality of paths between the communication device and the destination being parallel to each other, the communication device comprising:

a memory; and a processor coupled to the memory and configured to:

transmit a packet to each path of the plurality of paths, count a number of paths among the plurality of paths through which a response passes and reaches the communication device from the destination, the response being transmitted by the destination in response to the packet, determine an upper limit number of times of retransmission of another packet to the destination as a function of the number of paths, wherein the function represents an inverse proportion or a proportion with a negative slope;

transmit the another data packet towards the destination via a first adjacent node on a first path of the plurality of paths;

if a transmission failure of the another data packet is detected, retransmit the another data packet until the transmission is successful or the upper limit number of times of retransmission is reached;

if the upper limit number of times of retransmission is reached, select a second adjacent node on a second path of the plurality of paths; and transmit the another data packet towards the destination via the second adjacent node.

11. The communication device according to claim 10, wherein the packet is a test packet, and the another packet is a data packet including data acquired by the communication device from a sensor.

12. The communication device according to claim 10, wherein the packet and the another packet are data packets including data acquired by the communication device from a sensor.

* * * * *